May 26, 1925.
W. H. WILLISTON
CHECK VALVE
Filed July 19, 1923
1,539,617
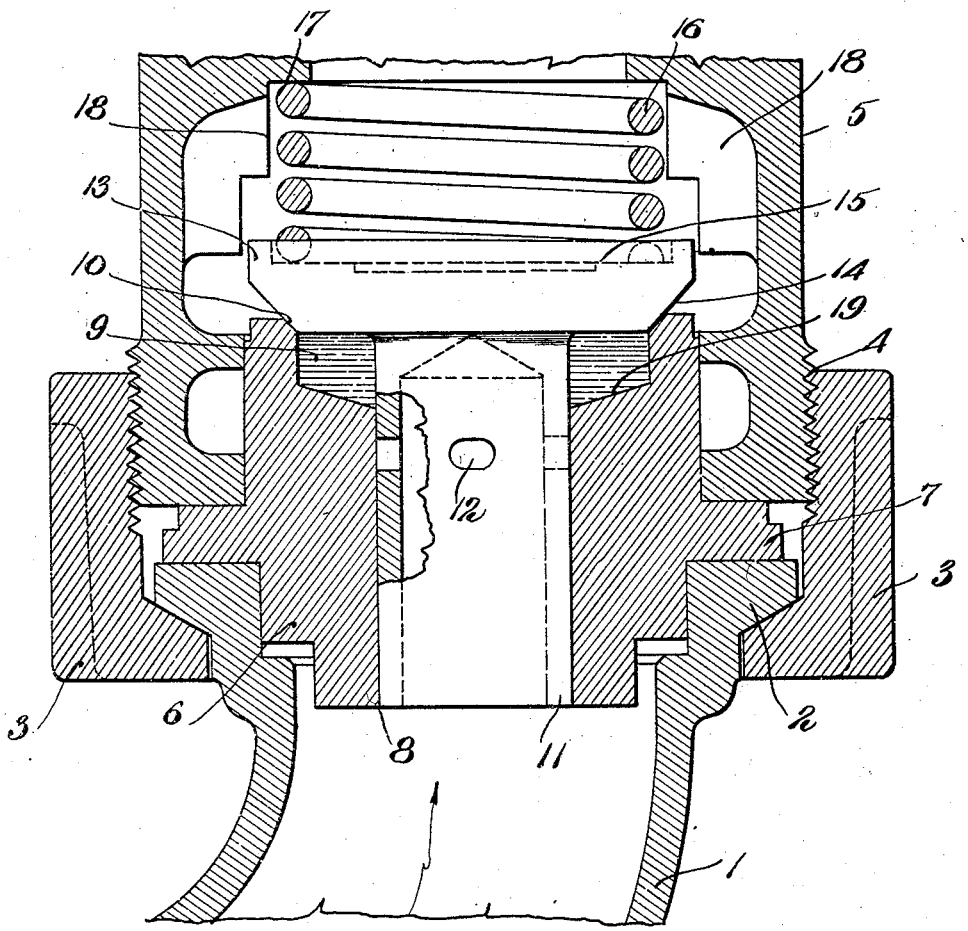
Inventor:
William H. Williston
by Roberts, Roberts & Cushman
Atty's.

Patented May 26, 1925.

1,539,617

UNITED STATES PATENT OFFICE.

WILLIAM H. WILLISTON, OF SOMERVILLE, MASSACHUSETTS, ASSIGNOR TO MANNING, MAXWELL & MOORE, INC., OF NEW YORK, N. Y., A CORPORATION OF NEW JERSEY.

CHECK VALVE.

Application filed July 19, 1923. Serial No. 652,534.

*To all whom it may concern:*

Be it known that WILLIAM H. WILLISTON, a citizen of the United States of America, and resident of Somerville, in the county of Middlesex and State of Massachusetts, has invented new and useful Improvements in Check Valves, of which the following is a specification.

This invention relates to improvements in check valves and has particular reference to an automatically operating valve designed for use in the feed-water line to a steam boiler or in other pressure lines where the pressure is intermittently varied as by a reciprocating or other form of pulsating pump mechanism.

Difficulty has been experienced in connection with structures of this nature due to hammering of the valve which produces a disagreeable noise and vibration and causes rapid wear of the parts, necessitating their frequent repair or replacement. It is the purpose of the present invention to provide an efficient automatically operating check valve assembly for insertion in a pipe line which will reduce to a minimum both the noise of operation of the valve and also the wear of the parts.

The figure is a sectional view of one embodiment of the invention.

In one aspect the invention contemplates a check valve assembly which, when in operation, automatically utilizes the fluid flowing therethrough to cushion the seating of the valve. In another aspect the invention contemplates a construction which, in closing, tends to equalize the fluid pressure on the two sides of the head of the valve and in this manner approximately balances the forces acting upon the opposite sides of the valve so that the valve seats without excessive impact. These results are attained through employment of a casing having a fluid passageway, and main and auxiliary valves controlling the flow through the passageway. Said valves include a fluid space therebetween, and are interconnected for consecutive closing to cause the auxiliary valve to restrict the passageway and trap fluid in said space cushioning the subsequent seating of the main valve.

The auxiliary valve may comprise a hollow valve stem having ports for passage of the fluid under pressure as the stem is raised but which are closed by the walls of the passage as the valve moves into closing position. The casing has a chamber in which fluid is trapped by the closing of the valve ports so that the head forming the main valve engages the trapped fluid in its seating movements. The closing of the ports equalizes this pressure in the chamber and casing, and the trapped fluid has a cushioning effect since it must be compressed by the valve or forced out in a thin layer between the main valve and seat before the valve may be finally seated.

The particular check valve chosen for purposes of illustration includes an inlet pipe 1 having a flanged end 2 connected by coupling 3 with the threaded portion 4 of the outlet member 5. A detachable valve casing member or sleeve 6 has a flange 7 clamped between the ends of the inlet and outlet members.

This casing has a central passage 8 affording communication between the inlet and outlet members, the passage being enlarged at its upper end to provide the chamber 9 and the tapered valve seat 10.

The valve assembly comprises a hollow or tubular stem 11 having the outlet ports 12 and head 13. Head 13 has a taper face 14 for engagement with the seat 10 and an upper recess at 15 to receive the actuating spring 16. The other end of the actuating or closure spring 16 bears against a suitable shoulder 17 on the outlet member. The outlet member may also be formed with ribs 18 limiting the opening movement of the valve.

In operation, water or other fluid under pressure is forced through the member 1 toward member 5. The pressure is exerted against the valve stem 11, and when built up to a sufficient amount will overcome the pressure within the member 5 and that of spring 16 and will lift the valve. In this lifting action the member 14 is first disengaged from its seat 10 and the upward movement continued until ports 12 are disposed above the lower wall 19 of chamber 9. In this position the fluid under pressure will flow through ports 12, chamber 9, and between faces 10 and 14 into the outlet member 5. In the event of drop of pressure in the member 1 either through failure of the pump or other pressure producing device to operate, or intermediate the pressure producing pulsations of the pump, the reduction of pressure will allow spring 16 to close the valve; this closing action being accelerated by the difference between the pressures in members 1 and 5. As the valve starts to close, the ports 12 move below wall 19, acting as an auxiliary valve restricting reverse flow of the fluid, and subsequently stop and positively prevent such reverse flow. This traps fluid in chamber 9 and equalizes the pressure in the chamber and upper portion of the casing, thus appreciably reducing the force tending to seat the valve.

In addition the trapped fluid engages the lower face of head 13 in its closing movement, and is either compressed or, if the fluid is substantially incompressible, it is forced out in a thin layer between faces 10 and 14. In either event a cushioning effect is produced.

This greatly decreases or eliminates the usual pounding action and insures a quiet operating device of maximum efficiency and durability, the main valve either seating lightly or when used betwen a pump and a boiler not seating at all between successive impulses from the pump.

I claim:

1. Apparatus of the character described comprising a fluid passageway having therein a main valve and an auxiliary valve with a fluid space therebetween, and means interconnecting said valves to cause the auxiliary valve to restrict and close the passageway before the main valve seats, thereby to trap fluid in said space to cushion the seating of the main valve.

2. Apparatus of the character described comprising a fluid passageway having therein a main valve and an auxiliary valve with a fluid space therebetween, and means interconnecting said valves to cause the auxiliary valve to restrict and close the passageway before the main valve seats, thereby to trap fluid in said space to cushion the seating of the main valve, and means for sequentially closing said valves.

3. A check valve assembly comprising a casing having a passage, and an adjacent valve seat, an inlet member and an outlet member at opposite ends of the passage, a valve having a hollow stem slidable in the passage and a head for engagement with the seat, and a chamber in the casing intermediate the passage and seat, the valve stem having ports aligning with the chamber when the valve is in open position and closing upon commencement of the closing movement of the valve.

4. A check valve assembly comprising a casing having a passage and an adjacent valve seat, an inlet member and an outlet member at opposite ends of the passage, a valve having a hollow stem slidable in the passage and a head for engagement with the seat, and a chamber in the casing intermediate the passage and seat, the valve stem having ports aligning with the chamber when the valve is in open position, said ports being positoned on the stem for closure by the wall of the passage prior to the seating of the valve as it moves into closed position.

5. A pressure check valve assembly including a casing having a seat, a valve in the casing having a head for engagement with the seat, said valve being opened by fluid pressure thereagainst, means for forcing the head toward the seat on decrease of the opening pressure, and means for equalizing the pressure at opposite sides of the head prior to seating thereof.

Signed by me at Boston, Massachusetts, this seventeenth day of July, 1923.

WILLIAM H. WILLISTON.